US012282811B2

(12) United States Patent
Ryo

(10) Patent No.: US 12,282,811 B2
(45) Date of Patent: Apr. 22, 2025

(54) IMAGE FORMING APPARATUS, CONTROL METHOD THEREOF, AND STORAGE MEDIUM WITH CALCULATING OF PROCESSING LENGTH, WHICH IS LENGTH OF PRINT MEDIUM THAT CAN BE PROCESSED BY POST PROCESSING DEVICE

(71) Applicant: CANON KABUSHIKI KAISHA, Tokyo (JP)

(72) Inventor: Cho Ryo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/505,327

(22) Filed: Nov. 9, 2023

(65) Prior Publication Data
US 2024/0169174 A1    May 23, 2024

(30) Foreign Application Priority Data

Nov. 21, 2022    (JP) ................................ 2022-185749

(51) Int. Cl.
*G06K 15/02* (2006.01)
*G06F 3/12* (2006.01)
*G06K 15/00* (2006.01)

(52) U.S. Cl.
CPC ....... *G06K 15/1868* (2013.01); *G06F 3/1208* (2013.01); *G06F 3/1251* (2013.01); *G06F 3/1256* (2013.01); *G06K 15/024* (2013.01); *G06K 15/4065* (2013.01); *G06F 3/1284* (2013.01)

(58) Field of Classification Search
CPC .... G06F 3/1208; G06F 3/1251; G06F 3/1256; G06F 3/1284; G06K 15/1868; G06K 15/024; G06K 15/4065
See application file for complete search history.

(56) References Cited

U.S. PATENT DOCUMENTS

| 2019/0018627 | A1* | 1/2019 | Van Vliembergen ........................ G06F 3/1219 |
| 2023/0242363 | A1  | 8/2023 | Ryo |
| 2023/0251801 | A1* | 8/2023 | Ryo ..................... G06K 15/024 358/1.6 |
| 2023/0274115 | A1* | 8/2023 | Ryo .................. G06K 15/1882 358/1.1 |

FOREIGN PATENT DOCUMENTS

JP    2018-202689 A    12/2018

* cited by examiner

*Primary Examiner* — Nicholas Pachol
(74) *Attorney, Agent, or Firm* — Venable LLP

(57) ABSTRACT

An image forming apparatus includes an image forming unit, an acquisition unit configured to acquire an acceptable number for processing, which is a number of the plurality of images that can be processed by a post processing device, a calculation unit configured to calculate a number of divisions for a plurality of images in order to make a number of the images to be formed by the image forming unit equal to or smaller than the acceptable number for processing, and a control unit configured to control the image forming unit such that a positioning image used for positioning the plurality of images is formed with respect to the post processing device, for each of divided portions of the plurality of images that have been divided in accordance with the number of divisions.

8 Claims, 11 Drawing Sheets

FIG. 3

JOB LIST

| DOCUMENT NAME | NUMBER OF IMAGES | SHEET TYPE | TYPE |
|---|---|---|---|
| Document1 | 5 | PLAIN PAPER | POSITIONING PRINTING |
| Document2 | 4000 | PLAIN PAPER | MAIN PRINTING |
| Document3 | 7000 | PLAIN PAPER | MAIN PRINTING |
| Document4 | 5 | PLAIN PAPER | POSITIONING PRINTING |

DELETE — 302

LAYOUT SETTING — 303

PRINT — 304

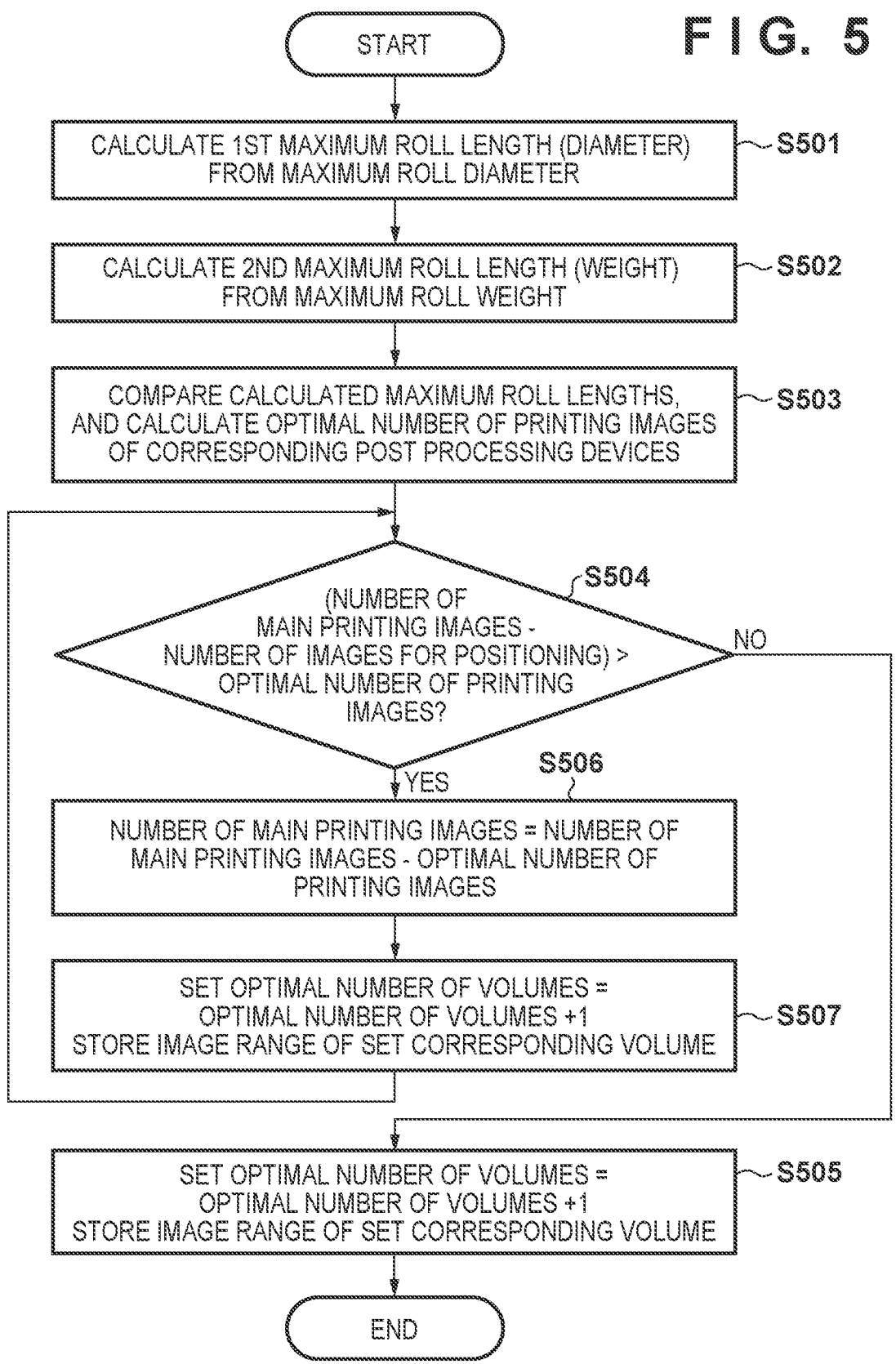

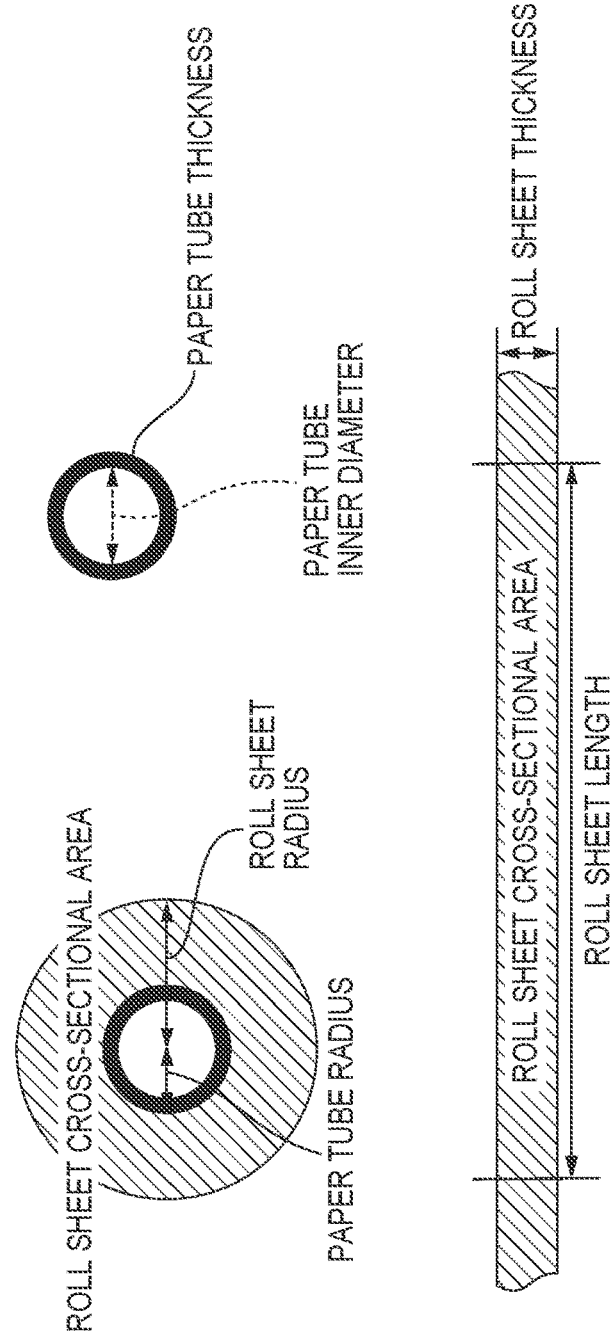

IMAGE FORMING APPARATUS, CONTROL METHOD THEREOF, AND STORAGE MEDIUM WITH CALCULATING OF PROCESSING LENGTH, WHICH IS LENGTH OF PRINT MEDIUM THAT CAN BE PROCESSED BY POST PROCESSING DEVICE

BACKGROUND OF THE INVENTION

Field of the Invention

The present invention relates to an image forming apparatus and a control method thereof.

Description of the Related Art

Conventionally, there is known an apparatus configured to print a label image on a label sheet pasted to a backing sheet. Such a printing apparatus prints a label image on a roll sheet formed of the backing sheet and the label sheet integrated together. The printed roll sheet is sent to a post processing device, and processing (referred to as a die cutting processing) is performed in which only the printed portion of the label sheet is clipped without clipping the backing sheet, in order to facilitate peeling of the label sheet from the backing sheet.

Rotary die cutting and laser half-cutting are known as typical die cutting processing. Rotary die cutting is processing of perforating the base material using a cylindrical rotary die. On the other hand, laser half-cutting is processing of cutting the target object midway through its thickness by changing the power and scanning speed of the laser beam.

In order to allow the post processing device to execute appropriate die cutting processing, the printing apparatus simultaneously prints a positioning image to determine the position of the label image. The post processing device detects the positioning image and performs die cutting.

Japanese Patent Laid-Open No. 2018-202689 discloses the following technique related to such label printing. First, when instructing printing with the arrangement of the label image and the positioning image being specified, a first sheet length required for printing a specified number of label images and positioning images in a print job is calculated. Next, a second sheet length remaining in the loaded roll sheet is calculated and compared with the first sheet length. Based on the comparison result, it is determined whether or not the print job can be processed with the length of the loaded roll sheet. When it is determined that the print job needs to be divided into the print jobs that are processed in a plurality of roll sheets, the positioning image to be printed at the end of the print job is arranged following the label image arranged on a roll sheet that will be printed earlier.

In a case where processing such as that described in Japanese Patent Laid-Open No. 2018-202689 is not performed, when a length of the loaded roll sheet is insufficient for the sheet length required for a single print job, the positioning image will not be printed on the roll sheet of an insufficient length for which the label printing is performed earlier. And thus, there arises a problem that die cutting positioning cannot be performed. The technique described in Japanese Patent Laid-Open No. 2018-202689 solves the problem by printing a positioning image on a roll sheet for which the label printing is performed earlier, even when a single print job is performed across a plurality of roll sheets.

Here, the post processing device has a limited outer diameter size, whereby the maximum roll diameter, the maximum weight, the maximum length or the like of a machinable roll sheet may be limited.

Specifically, a case is conceivable in which the sheet length required for printing the label image and the positioning image exceeds the limit of the external diameter size of the post processing device, as illustrated in FIG. 11A.

For example, it is assumed that the length which can be processed by the post processing device is a length for label images 1 to 50 and positioning images of up to two, as illustrated in FIG. 11B. In such a case, a label image must be used for positioning instead of the positioning image when the remaining label images 51 to 100 are processed by the post processing device, as illustrated in FIG. 11C. As a result, there arises a problem of an insufficient number of label images.

SUMMARY OF THE INVENTION

The present invention has been made in light of the foregoing problems, and provides an image forming apparatus that can perform printing of label images without causing a problem in the processing of the post processing device.

According a first aspect of the present invention, there is provided an image forming apparatus comprising: an image forming unit configured to form a plurality of images while a print medium is being drawn out and being conveyed from a roll of the print medium; an acquisition unit configured to acquire an acceptable number for processing, which is a number of the plurality of images that can be processed by a post processing device configured to perform post processing of the print medium after image formation has been performed by the image forming unit; a calculation unit configured to calculate a number of divisions for the plurality of images in order to make the number of the images to be formed by the image forming unit equal to or smaller than the acceptable number for processing; and a control unit configured to control the image forming unit such that a positioning image used for positioning the plurality of images is formed with respect to the post processing device, for each of divided portions of the plurality of images that have been divided in accordance with the number of divisions.

According to a second aspect of the present invention, there is provided a method for controlling an image forming apparatus comprising an image forming unit configured to form a plurality of images while a print medium is being drawn out and being conveyed from a roll of the print medium, the method comprising: acquiring an acceptable number for processing, which is a number of the plurality of images that can be processed by a post processing device configured to perform post processing of the print medium after image formation has been performed by the image forming unit; calculating a number of divisions for the plurality of images in order to make the number of the images to be formed by the image forming unit equal to or smaller than the acceptable number for processing; and controlling the image forming unit such that a positioning image used for positioning the plurality of images is formed with respect to the post processing device, for each of divided portions of the plurality of images that have been divided in accordance with the number of divisions.

Further features of the present invention will become apparent from the following description of exemplary embodiments with reference to the attached drawings.

BRIEF DESCRIPTION OF THE DRAWINGS

FIG. 3 is a diagram illustrating a job list;

FIGS. 4A to 4C are diagrams illustrating print setting screens;

FIG. 5 is a flowchart illustrating a calculation processing of an optimal number of volumes;

FIG. 6 is a diagram explaining a method of calculating a roll sheet length;

DESCRIPTION OF THE EMBODIMENTS

Figure 1:
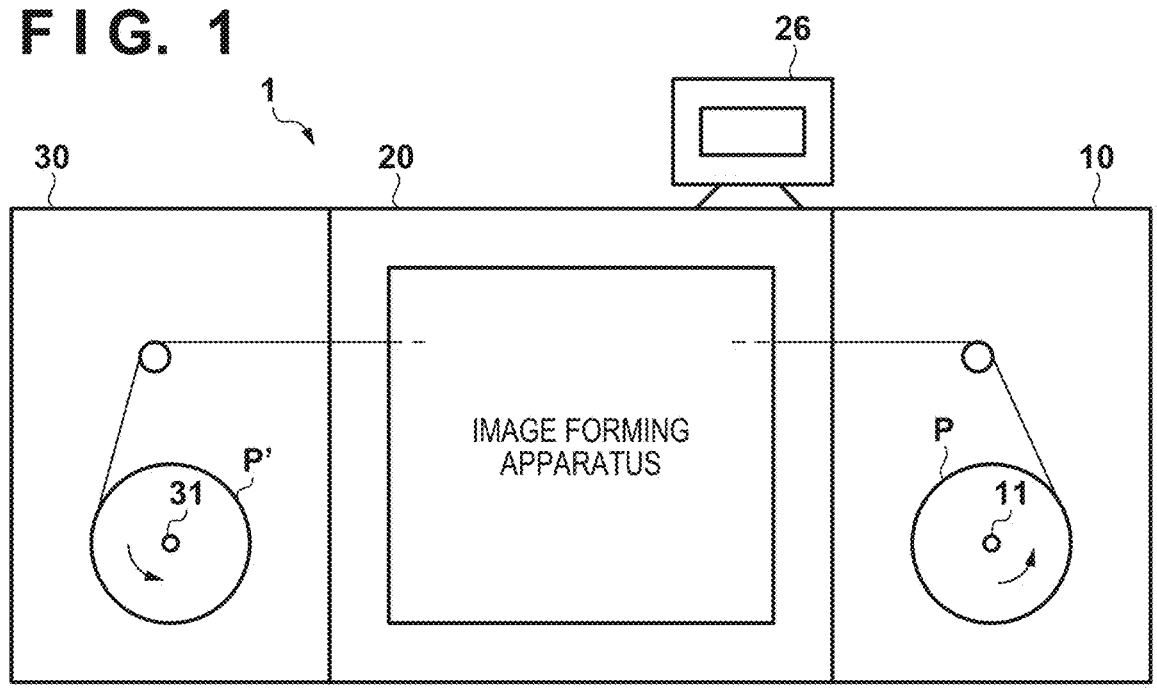
FIG. 1 is a diagram illustrating a configuration of an image forming system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a schematic diagram illustrating a configuration of an image forming system 1 according to a first embodiment of the present invention.

The image forming system 1 is a system configured to print a label image on a label sheet pasted to a backing sheet. More specifically, the label image is printed on a roll sheet (print medium) formed of a backing sheet and a label sheet integrated together. The printed roll sheet is sent to a post processing device, and a processing (referred to as a die cutting processing) is performed in which only the printed portion of the label sheet is clipped without clipping the backing sheet, in order to facilitate peeling of the label sheet from the backing sheet.

The image forming system 1 forms images on a roll sheet (continuous paper) P on which continuous images can be formed, as described above. The image forming system 1 is constituted by including a feeding apparatus 10, an image forming apparatus 20, and a winding apparatus 30 that are connected to the image forming system 1 in sequence from the upstream side along the conveyance direction of the roll sheet P.

The feeding apparatus 10 is an apparatus configured to supply the roll sheet P to the image forming apparatus 20. The feeding apparatus 10 rotates a paper tube of the roll sheet P around a rotating shaft 11 as the center of rotation, and conveys the roll sheet P wound around the paper tube toward the image forming apparatus 20 at a constant speed via a plurality of rollers (e.g., conveyance roller, feeding roller, etc.).

The image forming apparatus 20 forms images on the roll sheet P supplied from the feeding apparatus 10. The image forming apparatus 20 conveys the roll sheet P having an image formed thereon toward the winding apparatus 30.

The winding apparatus 30 is an apparatus configured to wind the roll sheet P conveyed from the image forming apparatus 20 around a paper tube as a center into a roll shape. The winding apparatus 30 winds the roll sheet P which has been conveyed via a plurality of rollers (e.g., conveyance rollers, feeding rollers) into a roll sheet P' as a product by rotating the paper tube around the rotating shaft 31 at a constant speed, as illustrated in FIG. 1, for example.

Here, an operation display unit 26 configured to be input instructions by the user is arranged in the image forming system 1.

Next, a control configuration of the image forming apparatus 20 will be described in detail.

Figure 2:
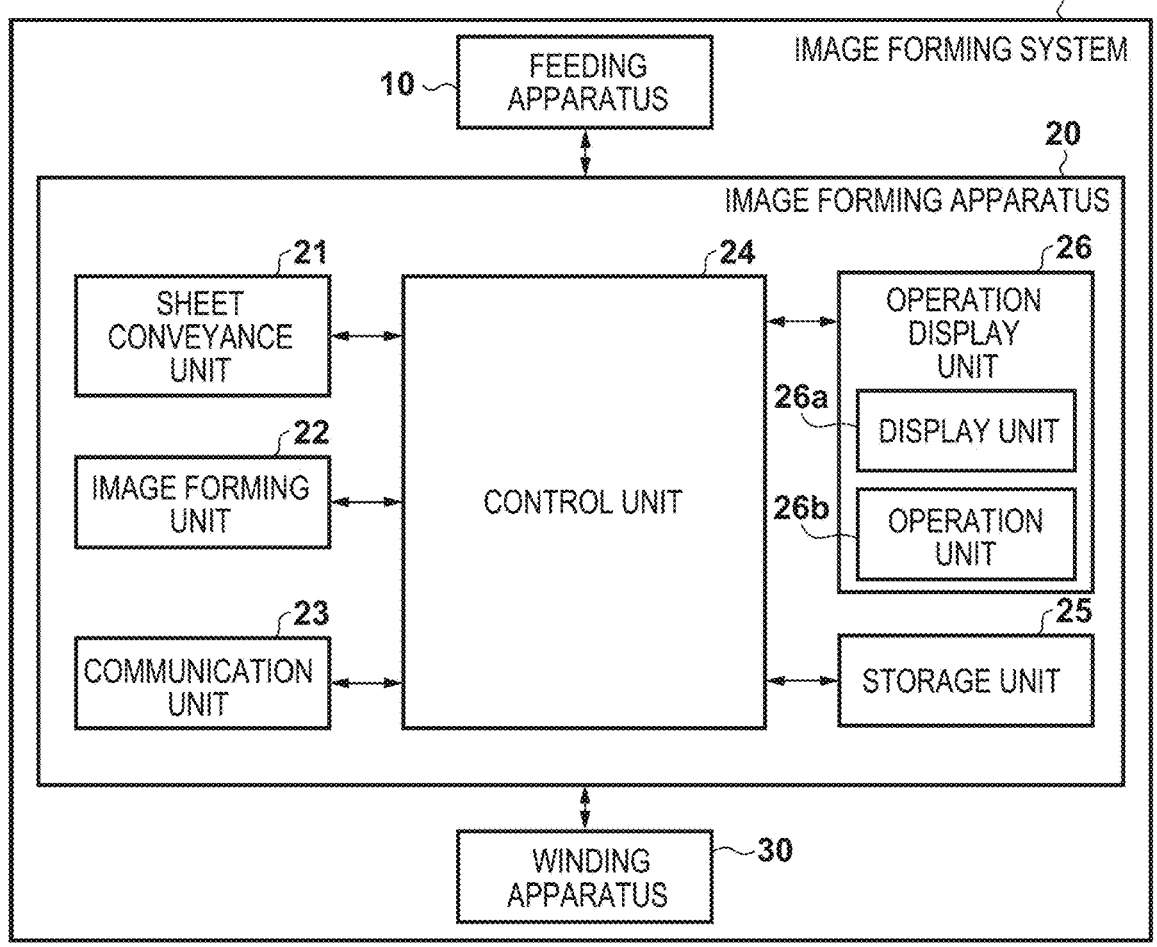
FIG. 2 is a block diagram of the image forming system.

FIG. 2 is a block diagram illustrating the control configuration of the image forming apparatus 20. In FIG. 2, the feeding apparatus 10 and the winding apparatus 30 are illustrated as external apparatuses of the image forming apparatus 20.

As illustrated in FIG. 2, the image forming apparatus 20 includes, for example, a sheet conveyance unit 21, an image forming unit 22, a communication unit 23, a control unit 24, a storage unit 25, and the operation display unit 26.

The sheet conveyance unit 21 is a conveyance mechanism for the roll sheet P inside the image forming apparatus 20 that conveys, by a plurality of rollers, for example, the roll sheet P that has been conveyed from the feeding apparatus 10 to the image forming unit 22, and conveys the roll sheet P that has passed through the image forming unit 22 to the winding apparatus 30.

The image forming unit 22 forms an image on the roll sheet P supplied from the feeding apparatus 10, based on print data to which an output instruction is received. The image forming unit 22 conveys the roll sheet P having an image formed thereon toward the winding apparatus 30.

The communication unit 23 includes a communication control card such as a Local Area Network (LAN) card, for example, and transmits and receives various data to and from an external apparatus (e.g., personal computer) connected via a communication network such as a LAN or a Wide Area Network (WAN).

The control unit 24 includes, for example, a Central Processing Unit (CPU), a Random Access Memory (RAM), or the like. The CPU of the control unit 24 reads out various programs such as system programs and processing programs stored in the storage unit 25, deploys them to the RAM, and executes various processing according to the deployed programs. For example, the control unit 24 performs image forming processing that executes an image forming job (referred to as "job", in the following) in response to the user's instruction.

The storage unit 25 includes, for example, a nonvolatile semiconductor memory (so-called flash memory), a Hard Disk Drive (HDD), or the like. The storage unit 25 stores various programs such as system programs and processing programs to be executed by the control unit 24, and various data required for executing such programs.

The operation display unit 26, which is formed of a Liquid Crystal Display (LCD) with a touch panel, for example, includes a display unit 26a and an operation unit 26b. The display unit 26a displays various types of information on a display screen in accordance with a display control signal input from the control unit 24. The operation unit 26b, which includes various types of operation keys such as a numeric keypad and a start key, accepts various input operations performed by the user, and outputs operation signals to the control unit 24. The operation display unit 26 is used for setting partition information in executing a job, for example.

Next, an operation of performing image forming processing to the roll sheet P by the image forming apparatus 20 will be described.

First, the user creates data of the job at an external apparatus such as a Personal Computer (PC) and performs print setting of the job. Here, the term "type" in the present embodiment refers to the type of job, representing either a positioning image job or a main printing image job. The data of the job and a job ticket including the print setting information of the job are transmitted to the image forming apparatus 20 via the communication network. The control unit 24 of the image forming apparatus 20 accepts the data of the job and the job ticket transmitted from the external apparatus via the communication unit 23.

FIG. 3 is a diagram illustrating an example of a print setting screen of a job list displayed on the display unit 26*a* by the control unit 24. As illustrated in FIG. 3, a display item 301 is a display list listing jobs that have been input. In the display item 301, job information or the like of jobs that have been input are listed in the order of input.

The job information includes, for example, document name, number of pages, number of copies, sheet type, type, spacing between images, or the like. In addition, the user can select a job from those listed on the display item 301 by operating the operation key of the operation unit 26*b*. FIG. 3 illustrates a state in which a main printing image job Document 2 is selected.

A display item 302 is a button that can accept an instruction to delete, from the storage unit 25, information of a job stored in the storage unit 25, which corresponds to the job selected in the display item 301. The display item 303 is a button that can accept a print setting instruction for the job selected in the display item 301. The display item 303 is enabled only when the main printing image job is selected in the display item 301. Pressing the display item 303 causes a print setting screen to be displayed. The display item 304 is a button that can accept an instruction to start image formation (printing) of the job selected in the display item 301.

Figure 4A:
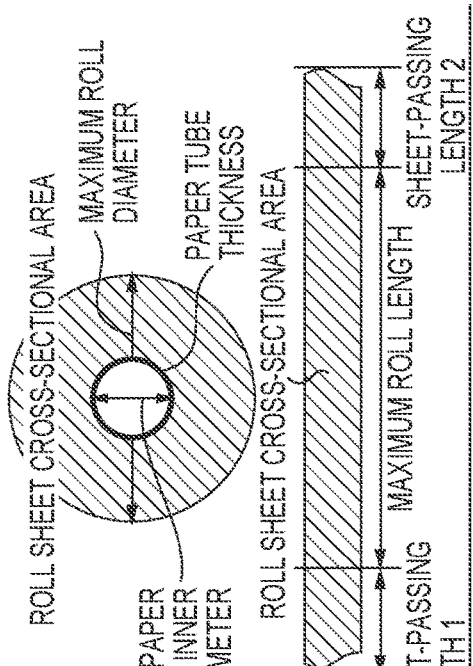
Figure 4B:
Figure 4C:
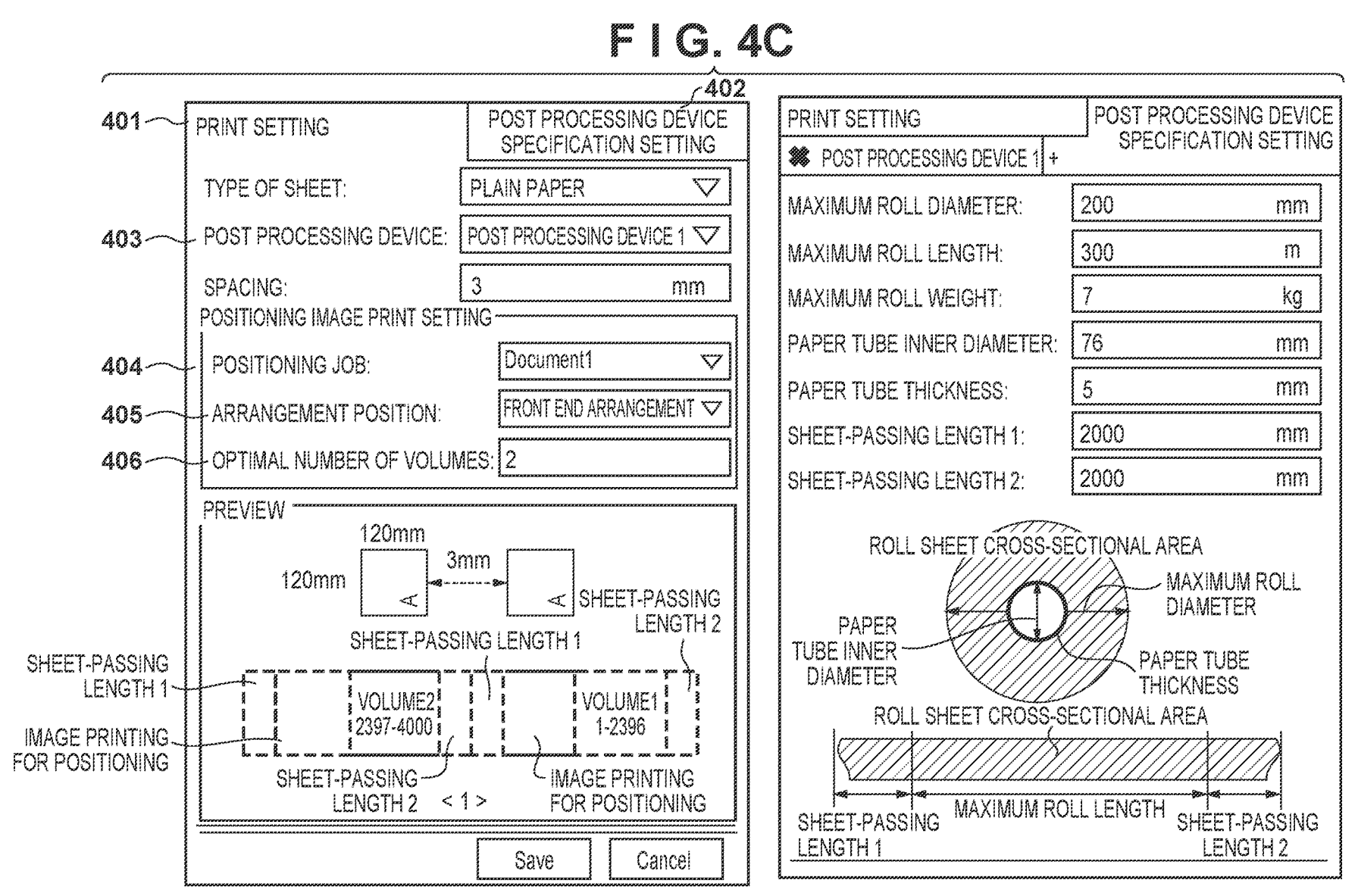

FIGS. 4A to 4C are diagrams illustrating an example of the print setting screen displayed on the display unit 26*a* by the control unit 24 when the display item 303 illustrated in FIG. 3 is pressed. As illustrated in FIGS. 4A to 4C, the print setting screen is displayed when the user selects a tab of a display item 401, and a specification setting screen of the post processing device is displayed when the user selects a tab of a display item 402. In the initial state, the print setting screen is displayed. As has been already explained, the post processing device in the present embodiment is an apparatus (die cutting apparatus) that clips only the printed portion of the label sheet without clipping the backing sheet, in order to facilitate peeling the label sheet from the backing sheet in the roll sheet.

The print setting screen is a screen that accepts settings related to a main printing image job. The print setting screen allows for displaying a print preview image of the job according to an input, change, or setting of, for example, type of sheet, selection of post processing device, spacing between images, selection of positioning image job, arranging position of the positioning image, user setting of a range of number of volumes, or the like.

The specification setting screen of the post processing device is a screen that displays a specification of a post processing device being registered. The specification setting screen of the post processing device allows for inputting or changing, for example, maximum roll diameter, maximum roll length, maximum roll weight, paper tube inner diameter, paper tube thickness, and sheet-passing length, which can be set to the post processing device. In addition, addition or deletion for the specification setting screen of the post processing device can be possible as necessary.

A display item 403 is an item for selecting a post processing device registered in the display item 402.

A display item 404 is an item for selecting a positioning image job being input. For example, a state of a positioning image job Document 1 being selected is illustrated in FIG. 4C.

A display item 406 is an item for calculating an optimal number of volumes (number of divisions for a roll sheet length that can be processed by the image forming apparatus 20), based on the specification of the post processing device registered on the specification setting screen of the post processing device.

When a post processing device is not selected in the display item 403, the optimal number of volumes is considered to be 1. For example, the optimal number of volumes in the display item 406 is 1, as illustrated in FIG. 4A.

A display item 407 is a preview screen displaying an image of a laying out result of a main printing image job according to the print setting set by the user. As illustrated in FIG. 4A, the main printing image job is considered to be a single volume, and the number of start images and the number of end images for that single volume are displayed in a field "volume 1".

In a case where a positioning job is not selected in the display item 404, operation on a display item 405 is disabled.

The display item 405 is an item for arranging the positioning image job at the front end or the rear end of the main printing image job. For example, the positioning image job is set to be the front end arrangement in FIGS. 4B and 4C.

FIGS. 4B and 4C illustrate an example of layout setting screens to be displayed when the registered post processing device 1 is selected in the display item 403 on the specification setting screen of the post processing device of the display item 402.

As illustrated in FIG. 4C, the post processing device 1 has a maximum roll diameter of 200 mm, a maximum roll length of 300 m, a maximum roll weight of 7 kg, a paper tube inner diameter of 76 mm, a paper tube thickness of 5 mm, a sheet-passing length 1 of 2000 mm, and a sheet-passing length 2 of 2000 mm. When a positioning job is selected in the display item 404, the control unit 24 calculates and displays an optimal number of volumes according to the specification of the post-press machine 1 (post processing device 1). An example of calculation processing of the optimal number of volumes according to the specification of the post processing device 1 will be described below, referring to FIG. 5. As illustrated in FIGS. 4B and 4C, the optimal number of volumes is 2 for the post processing device 1.

FIG. 5 is a flowchart illustrating the calculation processing of the optimal number of volumes to be executed by the control unit 24. The processing illustrated in FIG. 5 is realized by the CPU of the control unit 24 executing the system program stored in storage unit 35, for example. The processing illustrated in FIG. 5 starts when the display item 404 is selected. Here, the optimal number of volumes (number of divisions) is a value indicating the number of divisions (divided number of volumes) of the length of the roll sheet (number of main printing images) that can be processed by the image forming apparatus 20, which number of divisions will make the length to be within the length of the roll sheet (processing length) that can be processed by the post processing device 1 (number of images within the optimal number of printing images that can be processed by the post processing device 1 (within an acceptable number for processing)).

At S501, the control unit 24 calculates the maximum roll length (processing length) from the maximum roll diameter, based on the information of the specification settings of the post processing device 1 registered in the display item 402. In the following, the length corresponding to the maximum roll length derived from the maximum roll diameter will be referred to as a first maximum roll length. Based on the formula illustrated in FIG. 6, the first maximum roll length is calculated for a case where the paper tube inner diameter is 76 mm, the paper tube thickness is 5 mm, and the roll sheet thickness is 80 m. In a case of FIGS. 4B and 4C, the first maximum roll length of the post processing device 1 is calculated as follows.

A paper tube radius and a paper tube cross-sectional area are calculated as follows, with the paper tube inner diameter of 76 mm and the paper tube thickness of 5 mm:

paper tube radius=(76+5×2)/2=43 [mm]

paper tube cross-sectional area=43×43×3.14=5806 [mm$^2$]

On the other hand, the maximum roll diameter is 200 mm, which is the specification of the post processing device 1, and then the roll sheet radius is 100 mm, thus the roll sheet cross-sectional area including the paper tube is calculated as follows:

roll sheet cross-sectional area=100×100×3.14=31400 [mm$^2$]

Accordingly, the area calculated by subtracting the paper tube cross-sectional area from the roll sheet cross-sectional area is 31400-5806=25594 [mm$^2$]. As a result, the first maximum roll length of the post processing device 1 is calculated as follows:

first maximum roll length=25594 [mm$^2$]/80 [μm]=319927 [mm].

At S502, the control unit 24 calculates the maximum roll length from the maximum roll weight, based on the information of the specification settings of the post processing device 1 being registered. In the following, the length corresponding to the maximum roll length derived from the maximum roll weight will be referred to as a second maximum roll length. The second maximum roll length is calculated as follows:

second maximum roll length=maximum roll weight/ roll sheet width/grammage

The aforementioned formula corresponds to dividing the maximum roll weight by the weight per unit length of the roll sheet.

For the post processing device 1 of FIGS. 4B and 4C, the second maximum roll length of the post processing device 1 is calculated as follows, with the maximum roll weight of 7 kg, the roll sheet width of 280 mm, and the grammage of 81 g/m$^2$:

second maximum roll length=7 [kg]/280 [mm]/81 [g/m$^2$]=308642 [mm]

At S503, the control unit 24 compares the maximum roll length of the registered post processing device (third processing length), the first maximum roll length for the post processing device (first processing length), and the second maximum roll length for the post processing device (second processing length), and calculates the minimum value. In this calculation, a case where any of the maximum roll length, the first maximum roll length, and the second maximum roll length is 0, will be excluded from the comparison target. In addition, when all the maximum roll length, the first maximum roll length, and the second maximum roll length are 0, the total print length will be set to the minimum value. The control unit 24 sets the minimum value thus acquired as the optimal roll length of the post processing device currently being focused on. In other words, the length having the smallest value among a plurality of candidates acquired from each specification is set as the optimal roll length.

For the post processing device 1 of FIGS. 4B and 4C, the registered maximum roll length is 300000 mm, the first maximum roll length is 319927 mm, and the second maximum roll length is 308642 mm. Therefore, the maximum roll length of 300000 mm of the post processing device 1 is the minimum value.

As a result of subtracting the length of the sheet-passing length 1 and the length of the sheet-passing length 2, the optimal roll length of the post processing device 1 of FIGS. 4B and 4C are calculated as follows:

optimal roll length of the post processing device 1 of FIG. 4B=300000 [mm]-2000 [mm]-2000 [mm]=296000 [mm]

optimal roll length of post processing device 1 of FIG. 4C=300000 [mm]-2000 [mm]-2000 [mm]-120.0×5 [mm]-3×5 [mm]=295385 [mm]

The control unit 24 sets the optimal number of printing images (acceptable number for processing) to a value, which is calculated by dividing the optimal roll length by the sum of the width of the image and the spacing between images, and rounded down to the nearest whole number.

optimal number of printing images of the post processing device 1 of FIG. 4B=296000 [mm]/(120 [mm]+3 [mm])=2406 optimal number of printing images of the post processing device 1 of FIG. 4C=295385 [mm]/(120 [mm]+3 [mm])=2401

At S504, the control unit 24 compares the result of subtracting the number of positioning images from the number of main printing images with the optimal number of printing images. When the result of subtracting the number of positioning images from the number of main printing images is larger than the optimal number of printing images, the post processing device cannot process unless the number of main printing images to be processed by the image forming apparatus 20 is divided, and therefore the processing proceeds to S506. When, on the other hand, the result of subtracting the number of positioning images from the number of main printing images is equal to or smaller than the optimal number of printing images, the processing proceeds to S505.

In the case of FIGS. 4B and 4C, the result of subtracting the number of positioning images from the number of main printing images is larger than the optimal number of printing images, and therefore the processing proceeds to S506. At S506, the value calculated by subtracting the optimal number of printing images from the number of main printing images is set as the number of main printing images.

number of main printing images of FIG. 4B=4000-2406=1594 number of main printing images of FIG. 4C=4000-2401=1599

In other words, the number of main printing images that can be processed by the image forming apparatus 20 becomes larger by the aforementioned number than the optimal number of printing images that can be processed by the post processing device 1, indicating that unless the number of images to be processed by the image forming apparatus 20 is divided into two volumes, the post processing device 1 cannot process.

The control unit 24 therefore determines, at S507, the optimal number of volumes to be a value increased by 1 more volume to the optimal number of volumes, and stores the main printing image range for the corresponding volume, and then the processing is repeated from S504. In the case of FIGS. 4A to 4C, the initial value of the optimal number of volumes is 0 and, as a result of increasing by 1, the number is calculated as follows:

optimal number of volumes=0+1=1

However, a value of 1 is further added at a subsequent S505 in the present flowchart, and therefore the final optimal number of volumes is the aforementioned number+1.

The main printing image range is a result of subtracting the number of positioning images from the optimal number of printing images, and is given as follows:

The main printing image range of the volume 1 of FIG. 4B is from an image 1 to an image 2401.

The main printing image range of the volume 1 of FIG. 4C is from the image 1 to an image 2396.

Next, the processing returns from S507 to S504, and a second determination is made at S504. Here, the number of main printing images of FIG. 4B=1594 and the number of main printing images of FIG. 4C=1599, and therefore the control unit 24 determines that the result of subtracting the number of positioning images from the number of main printing images is equal to or less than the optimal number of printing images and the processing proceeds to S505.

At S505, the control unit 24 determines the optimal number of volumes to be a value increased by 1 to the optimal volume number, and stores the main printing image range of the corresponding volume. The determined optimal number of volumes is set in the display item 406, and subsequently the processing illustrated in FIG. 5 is terminated. In the case of FIGS. 4B and 4C, the number is calculated as a result of increasing by 1 as follows:

optimal number of volumes=1+1=2

The main printing image range is thus given as described below.

The main printing image range of the volume 2 of FIG. 4B is from an image 2402 to an image 4000.

The main printing image range of the volume 2 of FIG. 4C is from an image 2397 to the image 4000.

As has been described above, the present embodiment allows for calculating the optimal number of volumes (number of divisions of the main printing images required for processing in the image forming apparatus 20) in accordance with the specification limitations of the post processing device.

In the case of FIGS. 4B and 4C, the optimal number of volumes is 2, as illustrated. An image of a laying out result, such as the display item 407, is displayed, with setting values of the width and the length of the main printing image being 120.0 mm and 120.0 mm, respectively, and an object spacing being 3 mm, together with the settings of the display item 404 and the display item 405.

A display item 408 is a button for storing, in the storage unit 25, the print setting information set by the user. By pressing the display item 408, the print setting information is stored in the storage unit 25.

Figure 7:
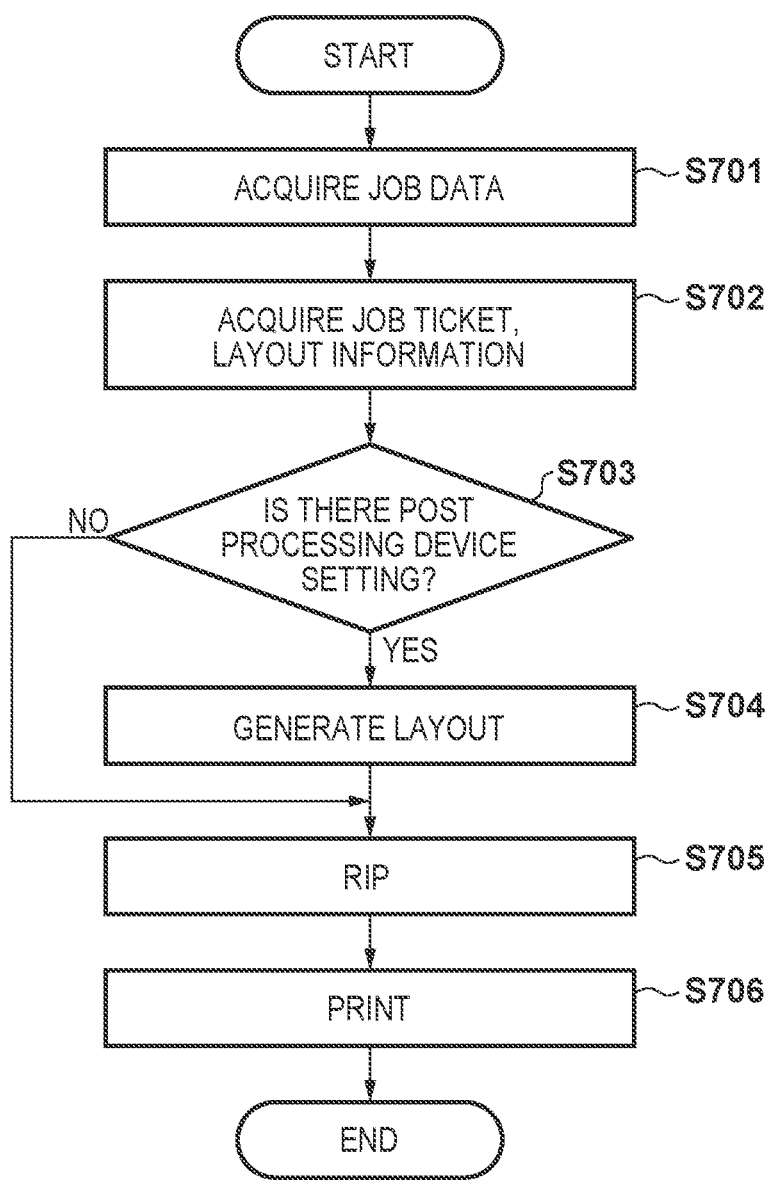
FIG. 7 is a flowchart illustrating image forming processing for a roll sheet.

FIG. 7 is a flowchart illustrating processing of performing printing on the roll sheet P. The processing illustrated in FIG. 7 is realized by the CPU of the control unit 24 executing the system program stored in the storage unit 35. The processing illustrated in FIG. 7 starts, for example, when the main printing image job is selected in the display item 301 and the display item 304 is pressed.

At S701, the control unit 24 acquires the main printing image job data and the positioning image job data selected in the display item 301.

At S702, the control unit 24 acquires the job ticket of the job selected in the display item 301 and the print setting information set by the user.

At S703, the control unit 24 determines the existence or absence of a setting of the post processing device. When it is determined at S703 that there is no setting of the post processing device, the processing proceeds to S705.

At S704, the control unit 24 divides the job into a plurality of volumes at the start image and the end image of each volume, based on the print setting information set by the user, arranges a positioning image on each divided volume (divided portion), and adds the sheet-passing length or the like before and after each volume.

At S705, the control unit 24 performs Raster Image Processing (RIP) on the job to generate image data for printing. In the job mentioned here, layout generation is not performed when it is determined at S703 that there is no setting of the post processing device. When, on the other hand, it is determined at S703 that there is a setting of the post processing device, layout generation is performed.

At S706, the control unit 24 causes the image forming unit 22 to form an image on the roll sheet P based on the image data, and subsequently terminates the processing illustrated in FIG. 7.

As such, the present embodiment allows for printing an appropriate number of main printing images and positioning images in accordance with the specification limitations of the post processing device.

Second Embodiment

Hereinafter, the second embodiment of the present invention will be described.

The configuration of the image forming apparatus 20 according to the second embodiment is similar to that described in the first embodiment. In the first embodiment, positioning images are uniformly arranged for the optimal number of volumes determined in accordance with the specification limitations of the post processing device, the positioning images can only be arranged in a volume specified by the user in the second embodiment.

First, the user instructs at an external apparatus such as a PC to transmit data of a job and a job ticket including print setting information of the job to the image forming apparatus 20 via the communication network. The control unit 24 of the image forming apparatus 20 accepts the data of the job and the job ticket transmitted from the external apparatus via the communication unit 23.

Figure 8:
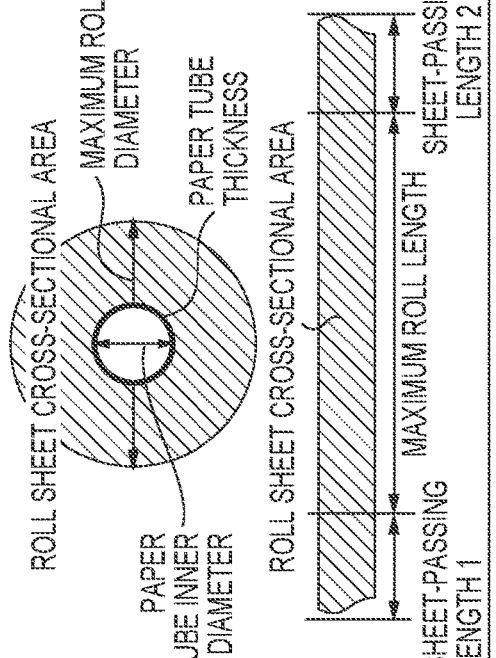
FIG. 8 is a diagram illustrating a print setting screen.

FIG. 8 is a diagram illustrating an example of a print setting screen that is displayed on the display unit 26a by the control unit 24 when the display item 303 is pressed in a state in which a main printing image job Document 4 is selected. Explanation of the display items 801, 802, 803, 804 and 806 illustrated in FIG. 8 is similar to that of the display items 403, 404, 405, 406 and 407 illustrated in FIGS. 4A to 4C.

As illustrated in FIG. 8, a post processing device 2 has a maximum roll diameter of 280 mm, a maximum roll length of 350 m, a maximum roll weight of 7 kg, a paper tube inner diameter of 76 mm, a paper tube thickness of 5 mm, a sheet-passing length 1 of 2000 mm, and a sheet-passing length 2 of 2000 mm. The post processing device 2 is selected in the display item 801, and the Document 4 is selected in the display item 802 as the positioning job. In such a case, the optimal number of volumes is calculated in accordance with the specification of the post processing device 2, and an optimal number of volumes is 3. Actual calculation is performed as follows:

paper tube radius=(76+5×2)/2=43 [mm]

paper tube cross-sectional area=43×43×3.14=5806 [mm$^2$]

roll sheet cross-sectional area=140×140×3.14=61544 [mm$^2$]

Accordingly, the area resulting from subtracting the paper tube cross-sectional area from the roll sheet cross-sectional area is calculated as 61544−5806=55738 [mm$^2$]. As a result, the first maximum roll length of the post processing device 2 is calculated as follows:

first maximum roll length=55738 [mm$^2$]/80 [μm]=696725 [mm]

second maximum roll length=7 [kg]/280 [mm]/81 [g/m$^2$]=308642 [mm]

For the post processing device 2 illustrated in FIG. 8, the registered maximum roll length is 350000 mm, the first maximum roll length is 696725 mm, and the second maximum roll length is 308642 mm. Therefore, the second maximum roll length of 308642 mm is the minimum roll length for the post processing device 2.

As a result of subtracting the length of the sheet-passing length 1 and the length of the sheet-passing length 2, the optimal roll length of the post processing device 2 illustrated in FIG. 8 is calculated as follows:

optimal roll length of the post processing device 2=308642 [mm]−2000 [mm]−2000 [mm]=304642 [mm]

The control unit 24 sets the optimal number of printing images to a value, which is calculated by dividing the optimal roll length by the sum of the width of the image and the spacing between images, and rounded down to the nearest whole number.

optimal number of printing images for the post processing device 2=304642 [mm]/(120 [mm]+3 [mm])=2476

As a result of calculating the optimal number of volumes in accordance with the specification of the post processing device 2 illustrated in FIG. 8, the optimal number of volumes is 3, as has already been described above. In addition, the main printing image range of the volume 1 from an image 1 to an image 2471, the main printing image range of the volume 2 is from an image 2472 to an image 4943, and the main printing image range of the volume 3 is from an image 4944 to an image 7000.

A display item 805 is an item for the user to specify the volume in which the positioning image job is arranged, in accordance with the calculated optimal number of volumes. An example of recalculation processing of the image range for each volume in accordance with the user's specification will be described, referring to FIG. 9. For example, a case will be described, where numbers 1 and 3 (the first and the third volumes) as a user-specified range are entered, as illustrated in FIG. 8.

Figure 9:
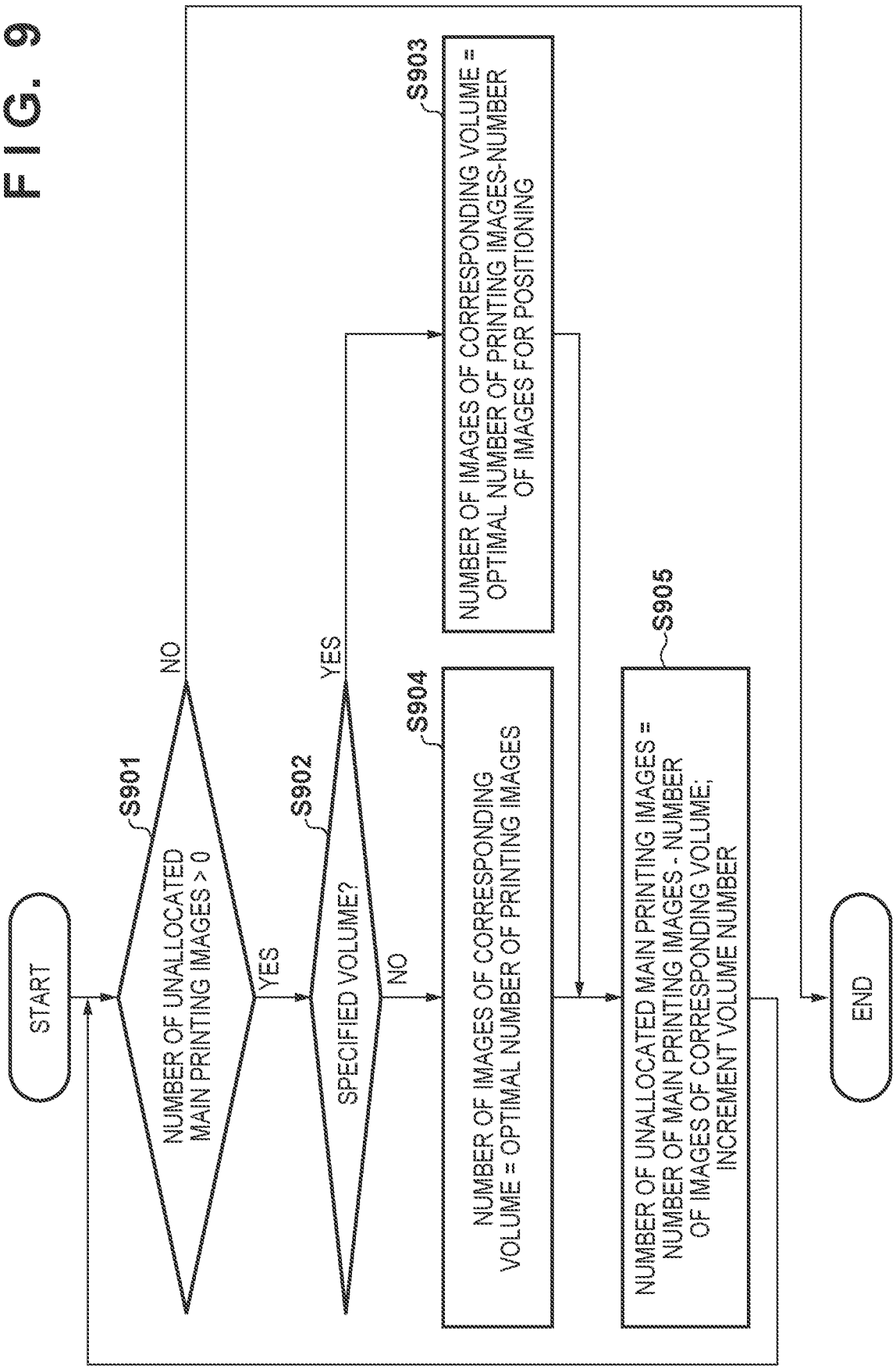
FIG. 9 is a flowchart illustrating calculation processing of the number of images in a specified volume.

FIG. 9 is a flowchart illustrating processing executed by the control unit 24 for calculating an image range of each volume in response to user's specification. The processing of FIG. 9 is realized by the CPU of control unit 24 executing the system program stored in storage unit 35, for example. The processing of FIG. 9 starts when a user-specified range is entered to the display item 805.

At S901, the control unit 24 determines the presence or absence of the number of unallocated printing images. When the number of unallocated printing images is 0, the processing illustrated in FIG. 9 is terminated. When, on the other hand, the number of unallocated printing images is larger than 0, the processing proceeds to S902. For example, it is assumed in the present embodiment that the initial value of the number of unallocated printing images is 7000. Therefore, the processing proceeds from S901 to S902.

At S902, the control unit 24, starting from the first volume, determines whether or not there is a match with the volume number entered in the display item 805. When a volume number matches the volume number entered in the display item 805, the processing proceeds to S903. When there is no match with the volume number entered in the display item 805, the processing proceeds to S904. Here, the first volume matches the volume number specified in the display item 805 illustrated in FIG. 8, and therefore the processing proceeds to S903.

At S903, the control unit 24 calculates the number of images for the corresponding volume and the processing proceeds to S905. Here, in order to print a positioning image, the number of positioning images is subtracted from the optimal number of printing images, whereby the number of images for the corresponding volume is given as follows:

number of images for the corresponding volume=optimal number of printing images−number of positioning images=2476−5=2471

At S905, the control unit 25 updates the number of unallocated main printing images and stores the main printing image range of the corresponding volume. In addition, the volume number is incremented, and the processing is repeated from S901. As the volume number is incremented, the number of unallocated main printing images is updated as follows:

number of unallocated main printing images=number of unallocated main printing images−number of images in the corresponding volume=7000−2471=4529

The main printing image range of the volume 1 is from an image 1 to an image 2471.

In the second determination at S901 after the processing is returned from S905, the control unit 24 determines that the number of unallocated main printing images=4529 is larger than 0, and the processing proceeds to S902.

At S902, the control unit 24 determines that the second volume does not match the volume number entered in the display item 805, and the processing proceeds to S904.

At S904, the control unit 24 calculates the number of images for the corresponding volume. Here, the positioning image is not printed and therefore the number of images for the corresponding volume matches the optimal number of printing images.

> number of images for the corresponding volume=optimal number of printing images=2476

At S905, the control unit 24 calculates the number of unallocated main printing images as follows:

> number of unallocated main printing images=number of unallocated main printing images−number of images for the corresponding volume=4529−2476=2053

The main printing image range of the volume 2 is from an image 2402 to an image 4878.

As a result of processing from S901 again, the printing image range of the volume 3 is from an image 4879 to an image 7000.

As has been described above, the present embodiment allows for specifying, in accordance with the user's specification, whether or not to print a positioning image on each volume, and calculating an image range for each volume.

Here, an image of a laying out result such as the display item 806 is updated. In the calculation processing of FIG. 9, if the image range does not exist for the user-specified volume, a warning message is displayed reminding of this fact. For example, a message such as "Volume X does not exist. Please check the image range of the updated layout image." is displayed. Such a message allows the user to check the number of volumes and the image range from the updated layout image.

Figure 10:
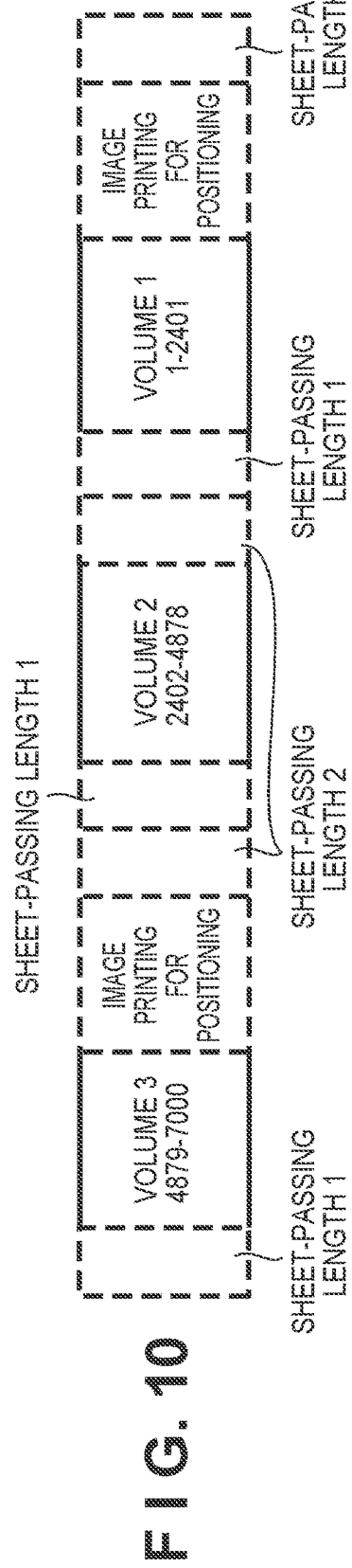
FIG. 10 is a conceptual diagram of a product printed on a roll sheet.
Figure 11A:
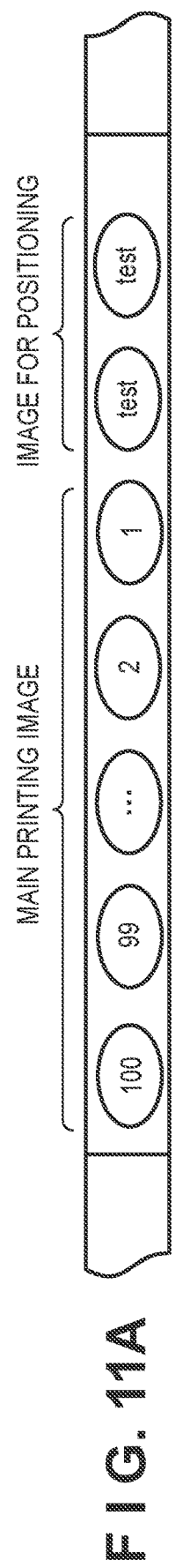
FIGS. 11A to 11C are diagrams illustrating a positioning image in a conventional embodiment.
Figure 11B:
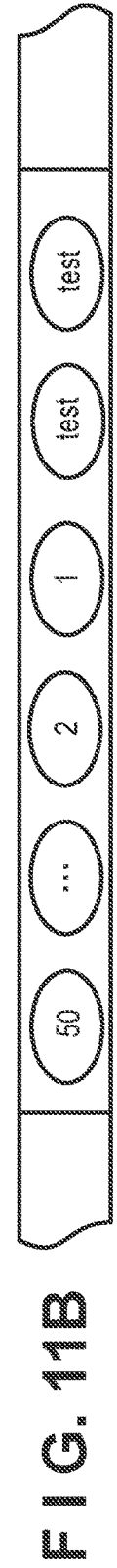
Figure 11C:
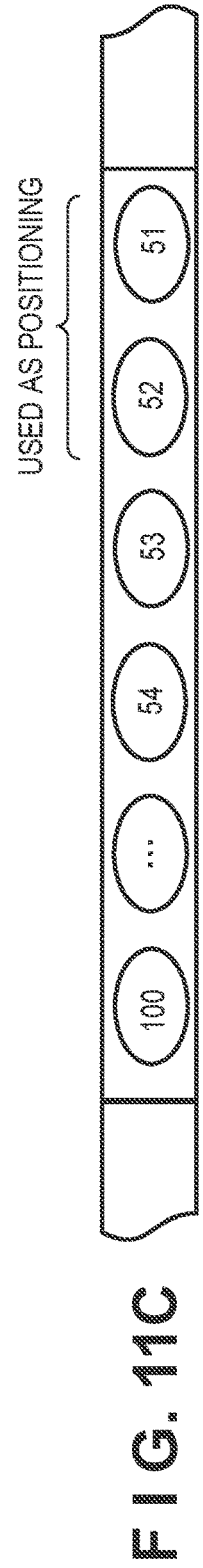

The foregoing provides a product such as that illustrated in FIG. 10, for example. As illustrated in FIG. 10, positioning images are arranged at the rear end of the volume 1 and the rear end of the volume 3, but not at the rear end of volume 2, in accordance with the user's specification.

As such, the present embodiment allows for arranging a positioning image only on a specified volume. Accordingly, it becomes possible to print the minimum required number of positioning images for position detection by a post processing device, in accordance with a specification of the post processing device, and a requirement for decentralized processing by a plurality of post processing devices.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-185749, filed Nov. 21, 2022, which is hereby incorporated by reference herein in its entirety.

What is claimed is:

1. An image forming apparatus comprising:
an image forming mechanism configured to form a plurality of images while a print medium is being drawn out and being conveyed from a roll of the print medium; and
at least one processor or circuit configured to function as a plurality of units comprising:
(1) an acquisition unit configured to acquire an acceptable number for processing, which is a number of the plurality of images that can be processed by a post processing device configured to perform post processing of the print medium after image formation has been performed by the image forming mechanism;
(2) a calculation unit configured to calculate a number of divisions for the plurality of images in order to make the number of the images to be formed by the image forming mechanism equal to or smaller than the acceptable number for processing; and
(3) a control unit configured to control the image forming mechanism such that a positioning image used for positioning the plurality of images is formed with respect to the post processing device, for each of divided portions of the plurality of images that have been divided in accordance with the number of divisions,
wherein the acquisition unit calculates a processing length, which is a length of the print medium that can be processed by the post processing device, based on a maximum roll diameter and a maximum roll weight of the roll of the print medium that can be processed by the post processing device,
wherein the acquisition unit calculates a first processing length corresponding to the processing length by dividing, by the thickness of the print medium, the cross-sectional area of the maximum roll diameter of the print medium that can be processed by the post processing device,
wherein the acquisition unit calculates a second processing length corresponding to the processing length by dividing, by the weight per unit length of the print medium, the maximum roll weight of the print medium that can be processed by the post processing device,
wherein the acquisition unit acquires a third processing length corresponding to the processing length set to the post processing device, and
wherein the acquisition unit acquires, as a final processing length, a minimum value among the first processing length, the second processing length, and the third processing length.

2. The image forming apparatus according to claim 1, wherein the image forming mechanism forms a plurality of identical images on the print medium at constant spacing.

3. The image forming apparatus according to claim 1, wherein the acquisition unit calculates the acceptable number for processing by dividing the processing length by the sum of the width of the image and spacing between images.

4. The image forming apparatus according to claim 1, wherein the image forming mechanism forms the positioning image at a front end or a rear end of each of the divided portions.

5. The image forming apparatus according to claim 1, wherein the control unit controls the image forming mechanism such that the positioning image is formed at all of the plurality of the divided portions.

6. The image forming apparatus according to claim 1, wherein the at least one processor or circuit is configured to further function as a setting unit configured to set for which divided portion of the plurality of the divided portions is formed with the positioning image.

7. A method for controlling an image forming apparatus comprising an image forming mechanism, the image forming mechanism being configured to form a plurality of images while a print medium is being drawn out and being conveyed from a roll of the print medium, the method comprising:
  acquiring an acceptable number for processing, which is a number of the plurality of images that can be processed by a post processing device configured to perform post processing of the print medium after image formation has been performed by the image forming mechanism;
  calculating a number of divisions for the plurality of images in order to make the number of the images to be formed by the image forming mechanism equal to or smaller than the acceptable number for processing; and
  controlling the image forming mechanism such that a positioning image used for positioning the plurality of images is formed with respect to the post processing device, for each of divided portions of the plurality of images that have been divided in accordance with the number of divisions,
  wherein in the acquiring, a processing length, which is a length of the print medium that can be processed by the post processing device, is calculated based on a maximum roll diameter and a maximum roll weight of the roll of the print medium that can be processed by the post processing device,
  wherein in the acquiring, a first processing length corresponding to the processing length is calculated by dividing, by the thickness of the print medium, the cross-sectional area of the maximum roll diameter of the print medium that can be processed by the post processing device,
  wherein in the acquiring, a second processing length corresponding to the processing length is calculated by dividing, by the weight per unit length of the print medium, the maximum roll weight of the print medium that can be processed by the post processing device,
  wherein in the acquiring, a third processing length corresponding to the processing length set to the post processing device is acquired, and
  wherein in the acquiring, as a final processing length, a minimum value among the first processing length, the second processing length, and the third processing length is acquired.

8. A non-transitory computer-readable storage medium storing a program for causing a computer to execute each step of a method for controlling an image forming apparatus comprising an image forming mechanism, the image forming mechanism being configured to form a plurality of images while a print medium is being drawn out and being conveyed from a roll of the print medium, the method comprising:
  acquiring an acceptable number for processing, which is a number of the plurality of images that can be processed by a post processing device configured to perform post processing of the print medium after image formation has been performed by the image forming mechanism;
  calculating a number of divisions for the plurality of images in order to make the number of the images to be formed by the image forming mechanism equal to or smaller than the acceptable number for processing; and
  controlling the image forming mechanism such that a positioning image used for positioning the plurality of images is formed with respect to the post processing device, for each of divided portions of the plurality of images that have been divided in accordance with the number of divisions,
  wherein in the acquiring, a processing length, which is a length of the print medium that can be processed by the post processing device, is calculated based on a maximum roll diameter and a maximum roll weight of the roll of the print medium that can be processed by the post processing device,
  wherein in the acquiring, a first processing length corresponding to the processing length is calculated by dividing, by the thickness of the print medium, the cross-sectional area of the maximum roll diameter of the print medium that can be processed by the post processing device,
  wherein in the acquiring, a second processing length corresponding to the processing length is calculated by dividing, by the weight per unit length of the print medium, the maximum roll weight of the print medium that can be processed by the post processing device,
  wherein in the acquiring, a third processing length corresponding to the processing length set to the post processing device is acquired, and
  wherein in the acquiring, as a final processing length, a minimum value among the first processing length, the second processing length, and the third processing length is acquired.

* * * * *